(12) United States Patent
Jones et al.

(10) Patent No.: US 10,899,160 B1
(45) Date of Patent: Jan. 26, 2021

(54) IDENTIFICATION DOCUMENT WITH MULTIVIEW IMAGE

(71) Applicant: MorphoTrust USA, LLC, Billerica, MA (US)

(72) Inventors: Robert Jones, Andover, MA (US); Yecheng Wu, Lexington, MA (US); Daoshen Bi, Boxborough, MA (US)

(73) Assignee: Idemia Identity & Security USA LLC, Billerica, MA (US)

( * ) Notice: Subject to any disclaimer, the term of this patent is extended or adjusted under 35 U.S.C. 154(b) by 0 days.

(21) Appl. No.: 16/421,194

(22) Filed: May 23, 2019

Related U.S. Application Data

(63) Continuation of application No. 14/984,860, filed on Dec. 30, 2015, now abandoned.

(60) Provisional application No. 62/098,904, filed on Dec. 31, 2014, provisional application No. 62/098,276, filed on Dec. 30, 2014, provisional application No. 62/098,236, filed on Dec. 30, 2014.

(51) Int. Cl.
*B42D 25/309* (2014.01)
*B42D 25/351* (2014.01)
*B42D 25/45* (2014.01)

(52) U.S. Cl.
CPC ......... *B42D 25/309* (2014.10); *B42D 25/351* (2014.10); *B42D 25/45* (2014.10)

(58) Field of Classification Search
CPC . B42D 25/351; B42D 25/309; B42D 2035/36
USPC .......................................................... 283/77
See application file for complete search history.

(56) References Cited

U.S. PATENT DOCUMENTS

| | | | |
|---|---|---|---|
| 4,729,128 A | 3/1988 | Grimes | |
| 4,973,087 A | 11/1990 | Balogh | |
| 5,142,383 A | 8/1992 | Mallik | |
| 6,036,230 A * | 3/2000 | Farber | B42D 25/29 283/109 |
| 8,998,264 B2 * | 4/2015 | Dorfler | B42D 25/21 283/77 |
| 2004/0032489 A1 | 2/2004 | Tyra | |

(Continued)

FOREIGN PATENT DOCUMENTS

| | | |
|---|---|---|
| EP | 0372837 | 6/1990 |
| JP | 2000177229 | 6/2000 |

(Continued)

*Primary Examiner* — Kyle R Grabowski
(74) *Attorney, Agent, or Firm* — Fish & Richardson P.C.

(57) ABSTRACT

Methods, systems, and apparatus, including computer programs encoded on a computer storage medium, for applying a ghost image to an identification document that include the actions of obtaining a first image of an object. Identifying a first portion of the first image that corresponds with the object and a second portion of the first image that does not correspond with the object. Generating a second image by converting the first image to a negative image, and removing the second portion of the first image that does not correspond to the object. Generating a halftone image from the second image. Causing optically variable media to be applied to the identification document based on the halftone image. The optically variable media has a first appearance when viewed from in reflected light at a first angle and a second, different appearance when viewed in reflected light at a second, different angle.

18 Claims, 4 Drawing Sheets

(56) References Cited

U.S. PATENT DOCUMENTS

| | | |
|---|---|---|
| 2004/0160640 A1 | 8/2004 | Corrales |
| 2005/0161512 A1 | 7/2005 | Jones |
| 2006/0151989 A1* | 7/2006 | Muke .................. B41M 1/24 |
| | | 283/67 |
| 2007/0102921 A1 | 5/2007 | Wang |
| 2007/0132227 A1* | 6/2007 | Dean .................. B42D 25/29 |
| | | 283/72 |
| 2007/0273146 A1 | 11/2007 | Davis |
| 2009/0102605 A1 | 4/2009 | Kaule |
| 2010/0001508 A1 | 1/2010 | Tonnpkin |
| 2010/0045024 A1 | 2/2010 | Attner |
| 2010/0314861 A1 | 12/2010 | Amidror |
| 2011/0031735 A1* | 2/2011 | Gerigk ................ B42D 25/29 |
| | | 283/70 |
| 2011/0037247 A1* | 2/2011 | Tappij-Gielen ........ B32B 27/08 |
| | | 283/77 |
| 2011/0057040 A1 | 3/2011 | Jones |
| 2011/0139024 A1 | 6/2011 | Schiffmann |
| 2012/0074684 A1* | 3/2012 | Marchant .............. B42D 25/351 |
| | | 283/85 |
| 2012/0210107 A1 | 8/2012 | Luick |
| 2012/0228860 A1* | 9/2012 | Rauch ................. B42D 25/351 |
| | | 283/85 |
| 2013/0182300 A1* | 7/2013 | Muller ................ B42D 25/425 |
| | | 359/2 |
| 2014/0028775 A1 | 1/2014 | Lazzari |
| 2015/0210107 A1 | 7/2015 | Nugent |
| 2016/0086066 A1 | 3/2016 | Porras Soto |
| 2016/0109629 A1* | 4/2016 | Baloukas .............. B42D 25/29 |
| | | 283/91 |
| 2017/0046901 A1* | 2/2017 | Chosson ................ G07D 7/06 |

FOREIGN PATENT DOCUMENTS

| | | | |
|---|---|---|---|
| WO | WO 2008084315 | 7/2008 | |
| WO | WO-2008084315 A2 * | 7/2008 | ............ B42D 25/00 |
| WO | WO 2012117169 | 9/2012 | |
| WO | WO 2014186718 | 11/2014 | |

\* cited by examiner

IDENTIFICATION DOCUMENT WITH MULTIVIEW IMAGE

CROSS REFERENCE TO RELATED APPLICATIONS

This application is a continuation of U.S. application Ser. No. 14/984,860, filed Dec. 30, 2015, which claims priority to U.S. Patent Application Ser. No. 62/098,276 entitled "IDENTIFICATION DOCUMENT WITH WINDOW" and filed on Dec. 30, 2014; U.S. Patent Application Ser. No. 62/098,236 entitled "IDENTIFICATION DOCUMENT WITH MULTIVIEW IMAGE" and filed on Dec. 30, 2014; and U.S. Patent Application Ser. No. 62/098,904 entitled "IDENTIFICATION DOCUMENT WITH EMBEDDED 3D INFORMATION" and filed on Dec. 31, 2014, all of which are herein incorporated by reference in their entirety.

TECHNICAL FIELD

This disclosure generally relates to security features for identification ("ID") documents.

BACKGROUND

Identification ("ID") documents play a critical role in today's society. One example of an ID document is an ID card. ID documents are used on a daily basis to prove identity, to verify age, to access a secure area, to evidence driving privileges, to cash a check, and so on. Airplane passengers are required to show an ID document during check in, security screening, and prior to boarding their flight. In addition, because we live in an ever-evolving cashless society, ID documents are used to make payments, access an automated teller machine (ATM), debit an account, make a payment, and the like.

SUMMARY

In one general implementation, innovative of the subject matter described in this specification can be embodied by an identification document that includes a multilayer laminate and a ghost image applied to the first layer of the laminate. The ghost image includes optically variable media that has a first appearance when viewed from a front of the identification document in reflected light at a first angle and a second, different appearance when viewed from the front of the identification document in reflected light at a second, different angle. This and other implementations can each optionally include one or more of the following features.

In some implementations, the ghost image can be a halftone image.

In some implementations, the ghost image can be a halftone image generated from a photographic image by removing a background of the photographic image, converting the photographic image with the background removed to a negative greyscale image, and generating the halftone image from the negative greyscale image.

In some implementations, the ghost image can be a duplicate of an image on the front of the identification document.

In some implementations, the ghost image overlaps an image on the front of the identification document.

In some implementations, the ghost image can be a halftone image of a photographic image of a cardholder.

In some implementations, the first appearance is that of a positive image and the second appearance is that of a negative image.

In some implementations, ghost image is responsive to ultraviolet light.

In some implementations, ghost image is responsive to infrared light.

In some implementations, the optically variable media includes high refractive index (HRI) material.

In some implementations, the identification document includes a temperature-sensitive component, and the ghost image overlaps the temperature-sensitive component.

In another general implementation, innovative aspects of the subject matter described in this specification can be embodied in methods for applying a ghost image to an identification document that include the actions of obtaining a first image of an object. Identifying a first portion of the first image that corresponds with the object and a second portion of the first image that does not correspond with the object. Generating a second image by converting the first image to a negative image, and removing the second portion of the first image that does not correspond to the object. Generating a halftone image from the second image. Causing optically variable media to be applied to the identification document based on the halftone image. Other implementations of this aspect include corresponding systems, apparatus, and computer programs, configured to perform the actions of the methods, encoded on computer storage devices. These and other implementations can each optionally include one or more of the following features.

In some implementations, the first image is a color image, and generating the second image includes generating the second image by converting the first image to a negative image, removing the second portion of the first image that does not correspond to the object, and converting the first image to a greyscale image.

In some implementations, identifying the portion of the first image that correspond to the object and the portion of the first image that does not correspond to the object includes segmenting the first image.

In some implementations, the first image includes a portrait of an ID holder.

In some implementations, the object includes a face of a cardholder, and identifying the first portion of the first image includes detecting the face of the cardholder.

In some implementations, identifying the second portion of the first image includes identifying a background of the first image.

In some implementations, converting the first image to a negative image includes complementing values of pixels of the first image.

In some implementations, generating the halftone image from the second image includes performing using a dithering technique to generate the halftone image from the second image.

In some implementations, the halftone image is a frequency modulated halftone image.

In some implementations, the optical variable media includes a thermal transfer coating that includes a binder and an inorganic pigment, where a weight ratio of the binder to the inorganic pigment is between 2.5:1 and 0.4:1 binder to pigment.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
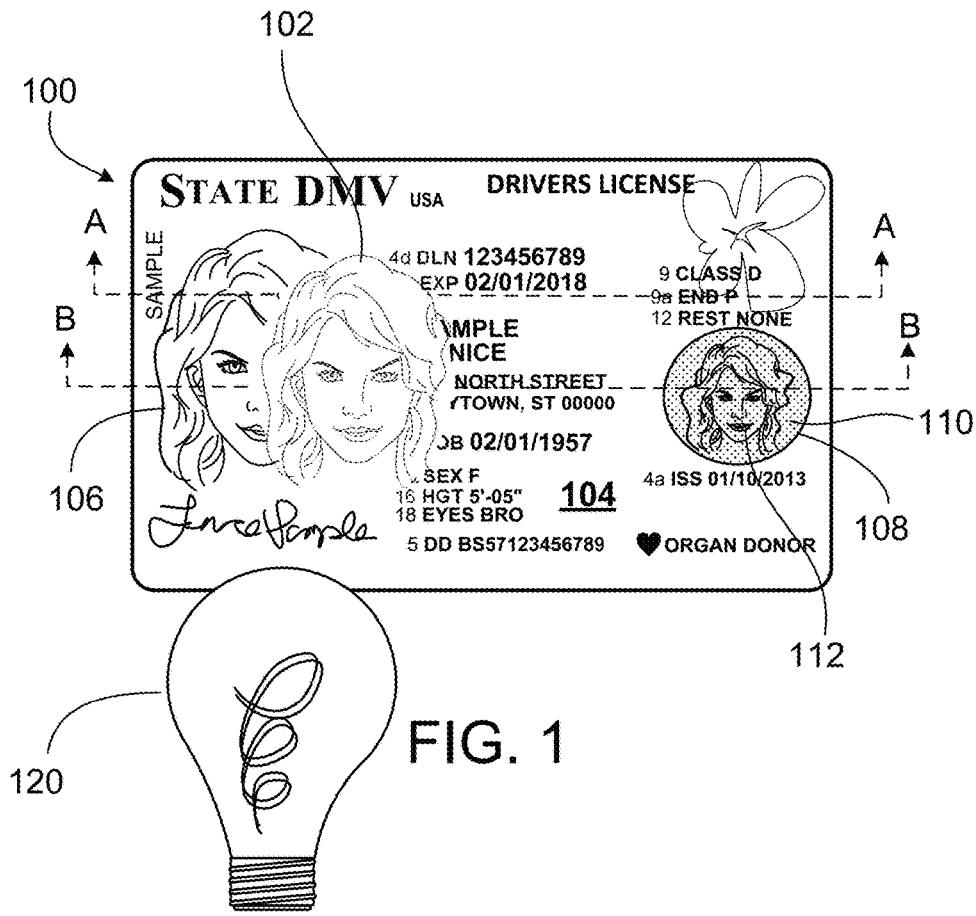
FIG. 1 depicts an exemplary ID document with an optically variable ghost image viewed from the front in reflected light.

Implementations of the present disclosure include identification (ID) documents with optically variable ghost images. As described herein, the appearance of an optically variable ghost image can change when viewed at different angles or in different lighting conditions. That is, the appearance of an optically variable ghost image can change based on the incident angle of light on the ID document or whether the light is reflected from or transmitted through the ID document (e.g., whether the ID is front lit or backlit). In some examples, an optically variable ghost image can have an appearance of a "positive" image at one angle and that of a "negative" image at another angle. In some examples, an optically variable ghost image can be visibly apparent in one lighting condition (e.g., reflected light), while becoming virtually invisible in other lighting conditions (e.g., transmitted light or backlighting).

In addition, implementations of the present disclosure also include methods for generating optically variable ghost images on ID documents. Optically variable ghost images can be created on ID documents by the use of mass transfer materials that reflect light in various ways. However, because the mass transfer materials used to create an optically variable ghost image 102 reflect incident light to produce an image instead of absorbing light as most dyes, the ghost images cannot be printed on an ID document directly from a traditional greyscale or color image (e.g., an ID holder's portrait). The processes described herein generate digital images from traditional greyscale or color images that can be effectively transferred to ID documents using mass transfer printing techniques to create optically variable ghost images.

As efforts to counterfeit identification documents become more sophisticated, additional features are needed for secure credentialing. For example, ID documents with optically variable ghost images allow personalized credentials to be added to an ID document in in a manner that is difficult to reproduce without sophisticated equipment and materials. This feature provides an additional security measure to identify counterfeit ID documents and increases the difficulty associated with making a forgery. Optically variable ghost images may include portraits, text, graphical patterns, images, and the like, and may be printed at any location in an ID document. In some examples, the visual effects of an optically variable ghost image are dependent on the location of the optically variable ghost image on the ID document.

Physical ID documents described herein are suitable for Dye Diffusion Thermal Transfer (D2T2) personalization, laser (e.g., YAG and $CO_2$) personalization, or both. These ID documents may be "over-the-counter" documents or "central issue" documents, and may be personalized in either process. The ID documents may have transparency enhancement properties. U.S. 2011/0057040, entitled "OPTICALLY VARIABLE PERSONALIZED INDICIA FOR IDENTIFATION DOCUMENTS" is incorporated by reference herein with respect to various features and fabrication processes related to physical ID documents.

As used herein, "ID document" is broadly defined and intended to include all types of physical and digital ID documents, including, documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, handgun permits (e.g., concealed handgun licenses (CHL)), badges, gift certificates or cards, membership cards or badges, and tags. Also, the terms "document," "card," "badge" and "documentation" are used interchangeably throughout this disclosure. In addition, ID document can include any item of value (e.g., currency, bank notes, and checks) where authenticity of the item is important, where counterfeiting or fraud is an issue, or both.

As used herein, "digital ID document" is broadly defined and intended to include a digital renderings (e.g., digital images) of ID documents (e.g., a corresponding physical ID document) by a software application that allows a customer to carry and display one or more forms of digital identification. In some examples, digital IDs can include multiple layers of security features to provide security and prevent counterfeiting. In some implementations, a first level of security features can include security features that are visually verifiable (e.g., by rendering on a display of a computing device, such as a smartphone) without the aid of a specialized viewing device. Such first level security features can include, for example, rotating images and holograms. A second level of security features can include, for example, provision of cardholder data that is verifiable visually with the assistance of security tools such as specialized 3D viewing devices, infrared (IR) transceivers, and other electronic code readers (e.g., QR code readers). Such first level security features can include, for example, embedded 3D information and audio, radiofrequency, or infrared (IR) digital watermarks.

ID documents such as driver licenses can contain information such as a photographic image, a bar code (which may contain information specific to the person whose image appears in the photographic image, and/or information that is the same from ID document to ID document), variable personal information, such as an address, signature, and/or birthdate, biometric information associated with the person whose image appears in the photographic image (e.g., a fingerprint), a magnetic stripe (which, for example, can be on the side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

In the production of images useful in the field of identification documentation, it may be desirable to embody into a document (such as an ID card, driver license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

As used herein, "identification" at least refers to the use of an ID document to provide identification and/or authentication of a user and/or the ID document itself. For example, in a driver license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one instance, include covert images that, when viewed using the proper facilitator (e.g., an appropriate light source for covert images, an appropriate temperature source for thermochromic images, etc.), provide a discernable image that is usable for identification or authentication purposes.

There are a number of reasons why an image or information on an ID document might not qualify as an "identification quality" image. Images that are not "identification quality" may be too faint, blurry, coarse, small, etc. to be able to be discernable enough to serve an identification purpose. An image that might not be sufficient as an "identification quality" image, at least in some environments, could, for example, be an image that consists of a mere silhouette of a person, or an outline that does not reveal what might be considered essential identification essential (e.g., hair color or eye color) of an individual.

Certain images may be considered to be "identification quality" if the images are machine readable or recognizable, even if such images do not appear to be "identification quality" to a human eye, whether or not the human eye is assisted by a particular piece of equipment, such as a special light source. For example, in at least one implementation, an image or data on an ID document can be considered to be "identification quality" if it has embedded in it machine-readable information (such as digital watermarks or steganographic information) that also facilitate identification and/or authentication.

Further, in at least some implementations, "identification" and "authentication" are intended to include (in addition to the conventional meanings of these words), functions such as recognition, information, decoration, and any other purpose for which an indicia can be placed upon an article in the article's raw, partially prepared, or final state. Also, in addition to ID documents, techniques described herein can be employed with product tags, product packaging, business cards, bags, charts, maps, labels, and the like, particularly those items including marking of a laminate or over-laminate structure. "ID document" thus is broadly defined herein to include these tags, labels, packaging, cards, etc.

"Personalization," "personalized data," and "variable" data are used interchangeably herein, and refer at least to data, characters, symbols, codes, graphics, images, and other information or marking, whether human readable or machine readable, that is (or can be) "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some implementations, personal/variable data can include some fixed data, as well.

For example, in at least some implementations, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads. Personalized and/or fixed data is also intended to refer to information that is (or can be) cross-linked to other information on the ID document or to the ID document's issuer. For example, personalized data may include a lot number, inventory control number, manufacturing production number, serial number, digital signature, etc. Such personalized or fixed data can, for example, indicate the lot or batch of material that was used to make the ID document, what operator and/or manufacturing station made the ID document and when, etc.

The terms "indicium" and "indicia" as used herein cover not only markings suitable for human reading, but also markings intended for machine reading, and include (but are not limited to) characters, symbols, codes, graphics, images, etc. Especially when intended for machine reading, such an indicium need not be visible to the human eye, but may be in the form of a marking visible only under infra-red, ultra-violet or other non-visible radiation. Thus, in at least some implementations, an indicium formed on any layer in an ID document may be partially or wholly in the form of a marking visible only under non-visible radiation. Markings including, for example, a visible "dummy" image superposed over a non-visible "real" image intended to be machine read may also be used.

"Laminate" and "overlaminate" include (but are not limited to) film and sheet products. Laminates usable with at least some implementations include those which contain substantially transparent polymers or which have substantially transparent polymers as a part of their structure. Examples of suitable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer, a film layer, or both.

The degree of transparency of the laminate can, for example, be dictated by the information contained within the ID document, the particular colors and/or security features used, etc. The thickness of the laminate layers is not critical, although in some implementations it may be preferred that the thickness of a laminate layer be about 1-20 mil (about 25-500 μm). Types and structures of the laminates described herein are provided only by way of example, those skilled in the art will appreciated that many different types of laminates are suitable.

For example, in ID documents, a laminate can provide a protective covering for the printed substrates and provides a level of protection against unauthorized tampering (e.g., a laminate would have to be removed to alter the printed information and then subsequently replaced after the alteration). The material(s) from which a laminate is made may be transparent, but need not be. Laminates can include synthetic resin-impregnated or coated base materials composed of successive layers of material, bonded together via heat, pressure, or both. As described herein, laminates may be fused polycarbonate structures formed in the absence of adhesives. Laminates also include security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxies.

For purposes of illustration, examples illustrate various aspects using images that are representative of a bearer of an ID document (e.g., a photographic likeness). However, virtually any indicium can be usable as an "image," which is used herein to include virtually any type of indicium.

In some examples, ID documents can be made of various materials (e.g., TESLIN-core, multi-layered ID documents) and fused polycarbonate structures. Indeed, it should be appreciated that implementations disclosed herein can be applied to many ID document materials formed in many different ways. For example, implementations can be applied to ID materials including, but not limited to, a laminate and/or coating, articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, Polyethylene terephthalate (PET), PET-G, PET-F, and polyvinyl chloride (PVC), and combinations thereof.

In other examples, an ID document having a window as described herein is fabricated in a platen lamination process, in which component layers of the ID document are fused together with heat, pressure, or both, without adhesives. Platen lamination allows the formation of flat cards with little or no thermal stress, as compared to roll lamination that creates stresses by stretching and laminating in a non-uniform manner. Platen lamination also reduces or eliminates surface interactions due to electrical charge and surface non-evenness, thereby improving card transportation in the card printer. One or more of the component layers may be preprinted (e.g., with invariable data). The resulting ID document is referred to herein as a "card blank" or "blank card." The invariable data may be present as microprint or added in an offset printing process on one of the layers used to construct the card blank.

Different image processing techniques may be used to preprocess an original image that is to be printed as images or graphics on an ID document. For example, different image processing techniques may be used prepare an embedded 3D image, a covert and/or optically variable image (using, for example, covert and/or optically variable media) for printing on an ID document depending on whether the tonality of image reproduction (e.g., printing process) is bitonal (e.g., two tones such as black and white or a first color and second color) or monochromatic (e.g., shaded image, grayscale, etc.). Other optional factors to consider include the viewing methods used with the image, such as reflectance, transmissivity characteristics (e.g., ultraviolet (UV) glowing) and tactility. As used herein, "optically variable device" (OVD) generally refers to an image (e.g., an iridescent image) that exhibits various optical effects such as movement or color changes when viewed.

In some cases, an image may be in digital form, such as resulting from being digitally captured, e.g., via a digital camera, optical sensor, etc., or through scanning a photograph with a scanner, etc. In at least some implementations, this captured image may be refined to produce an intermediate image, which can be transferred or printed (or used to generate an image to be transferred or printed) to the ID document as an optically variable ghost image or a covert image.

In certain cases, bimodal images (e.g., black and white images), such as those produced through mass-transfer thermal printing and laser xerography, may be implemented. Generally, in this implementation, a captured image is processed to bring out or otherwise enhance relevant features found in the captured image. Relevant features of a human face may include the face outline, nose and mouth pattern, ear outline, eye shape, eye location, hairline and shape, etc., or any other feature(s) that have been deemed to be relevant for identification purposes (e.g., particular features used with matching algorithms such as facial recognition algorithms). Once identified, these featured can be "thickened" or otherwise emphasized. The emphasized features can then form a digital version of an image, which can be transferred to an identification card.

Dye diffusion thermal transfer printing ("D2T2") and thermal transfer (also referred to as mass transfer printing) are two printing techniques that can be used to print information on identification cards. For example, D2T2 has been used to print images and pictures, and thermal transfer has been used to print text, bar codes, and single color graphics.

Dye diffusion is a thermal imaging technology that allows for the production of photographic quality images. In dye diffusion printing, one or more thermally transferable dyes (e.g., cyan, yellow, and magenta) are transferred from a donor, such as a donor dye sheet or a set of panels (or ribbons) that are coated with a dye (e.g., cyan, magenta, yellow, black, etc.) to a receiver sheet (which could, for example, be part of an ID document) by the localized application of heat or pressure, via a stylus or thermal printhead at a discrete point. When the dyes are transferred to the receiver, the dyes diffuse into the sheet (or ID card substrate), where the dyes will chemically be bound to the substrate or, if provided, to a receptor coating. Printing with successive color panels across the document can create an image in or on the document's surface. Dye diffusion can result in a very high printing quality, especially because the energy applied to the thermal print head can vary to vary the dye density in the image pixels formed on the receiver, to produce a continuous tone image. Dye diffusion can have an increased cost as compared to other methods, however, because of the special dyes needed and the cost of dye diffusion ribbons. Also, the quality of dye diffusion printed image may depend at least on an ability of a mechanical printer system to accurately spatially register a printing sequence, e.g., yellow, magenta, cyan, and black.

Another thermal imaging technology is thermal or mass transfer printing. With mass transfer printing, a material to be deposited on a receiver (such as carbon black, referred to by the symbol "K") is provided on a mass transfer donor medium. When localized heat is applied to the mass transfer donor medium, a portion (mass) of the material is physically transferred to the receiver, where it sits "on top of" the receiver. For example, mass transfer printing often is used to print text, bar codes, and monochrome images. Resin black mass transfer has been used to print grayscale pictures using a dithered gray scale, although the image can sometimes look coarser than an image produced using dye diffusion. However, mass transfer printing can sometimes be faster than dye diffusion, and faster printing can be desirable in some situations.

Printing of black ("K") can be accomplished using either dye diffusion or mass transfer. For example, black monochrome "K" mass transfer ribbons include Kr (which designates a thermal transfer ribbon) and Kd (which designates dye diffusion). The term "D2T2" is a combination of the phrases "Dye Diffusion" (D2) and "Thermal Transfer" (T2); T2 is a mass transfer ribbon panel and performs in a similar fashion as any other mass transfer technology. Both dye diffusion and thermal ink can be combined in a single ribbon (e.g., D2T2 ribbon), for example, a YMCK (Yellow-Magenta-Cyan-Black) ribbon. Another panel containing a protectant ("P") or laminate (typically a clear panel) also can be added to the YMCK ribbon. In some implementations, printing methodologies other than or in addition to D2T2 printing can be used. For example, the interlacing techniques can be achieved as part of a laser xerography or HP Indigo type printing processes.

Commercial systems for issuing ID documents are of two main types, namely so-called "central" issue (CI), and so-called "on-the-spot" or "over-the-counter" (OTC) issue. CI type ID documents are not immediately provided to the bearer, but are later issued to the bearer from a central location. For example, in one type of CI environment, a bearer reports to a document station where data is collected, the data are forwarded to a central location where the ID document is produced, and the ID document is forwarded to the bearer, often by mail. Another illustrative example of a CI assembling process occurs in a situation where a driver passes a driving test, but then receives her license in the mail from a CI facility a short time later. Still another illustrative example of a CI assembling process occurs in a situation where a driver renews her license by mail or over the Internet, then receives a driver license card through the mail.

In contrast, a CI assembling process is more of a bulk process facility, where many cards are produced in a centralized facility, one after another. For example, a situation where a driver passes a driving test, but then receives her license in the mail from a CI facility a short time later. The CI facility may process thousands of cards in a continuous manner.

Centrally issued ID documents can be produced from digitally stored information and generally include an opaque core material (also referred to as "substrate"), such as paper or plastic, sandwiched between two layers of clear plastic laminate, such as polyester, to protect the aforementioned items of information from wear, exposure to the elements and tampering. The materials used in such CI ID documents can offer durability. In addition, centrally issued digital ID documents generally offer a higher level of security than OTC ID documents because they offer the ability to print the variable data directly onto the core of the CI ID document which then joins the variable data in intimate contact with the preprinted features. Security features such as "microprinting," ultra-violet security features, security indicia and other features are currently used in both OTC and centrally issued ID documents. In the case of the OTC documents, in some examples, the preprinting is rarely if ever presented so that the preprinted features come into direct contact with the variable data—which is almost always done on the outside of the card. This generally makes the OTC variety less secure than other CI variants that do bring the two printing processes in contact.

In addition, a CI assembling process can be more of a bulk process facility, in which many ID documents are produced in a centralized facility, one after another. The CI facility may, for example, process thousands of ID documents in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI ID documents, OTC ID documents are issued immediately to a bearer who is present at a document-issuing station. An OTC assembling process provides an ID document "on-the-spot". An illustrative example of an OTC assembling process is a Department of Motor Vehicles ("DMV") setting where a driver license is issued to person, on the spot, after a successful exam. In some instances, the very nature of the OTC assembling process results in small, sometimes compact, printing and card assemblers for printing the ID document. It will be appreciated that an OTC card issuing process can be by its nature an intermittent process in comparison to a continuous process.

OTC ID documents of the types mentioned above can take a number of forms, depending on cost and desired features. Some OTC ID documents comprise highly plasticized poly(vinyl chloride) or have a composite structure with polyester laminated to 0.5-2.0 mil (about 13-51 μm) poly(vinyl chloride) film, which provides a suitable receiving layer for heat transferable dyes which form a photographic image, together with any variant or invariant information required for the identification of the bearer. These data are subsequently protected to varying degrees by clear, thin overlay patches (0.125-0.250 mil, or about 3-6 μm) applied at the printhead, holographic hot stamp foils (0.125-0.250 mil, or about 3-6 μm), or a clear polyester laminate (0.5-10 mil, or about 13-254 μm) supporting common security features. These last two types of protective foil or laminate sometimes are applied at a laminating station separate from the printhead. The choice of laminate dictates the degree of durability and security imparted to the system in protecting the image and other data.

One response to the counterfeiting of ID documents includes the integration of verification features that are difficult to copy by hand or by machine, or which are manufactured using secure and/or difficult to obtain materials. One such verification feature is the use in the ID document of a signature of the ID document's issuer or bearer. Other verification features have involved, for example, the use of watermarks, biometric information, microprinting, covert materials or media (e.g., ultraviolet (UV) inks, infrared (IR) inks, fluorescent materials, phosphorescent materials), optically varying images, fine line details, validation patterns or marking, and polarizing stripes. These verification features are integrated into an ID document in various ways and they may be visible or invisible (covert) in the finished card. If invisible, they can be detected by viewing the feature under conditions which render it visible. At least some of the verification features discussed above have been employed to help prevent and/or discourage counterfeiting.

Covert security features are those features whose presence is not visible to the user without the use of special tools (e.g., UV or IR lights, digital watermark readers) or knowledge. In many instances, a covert security feature is normally invisible to a user. Some technologies that involve invisible features require the use of specialized equipment, such as a detector or a device capable of reading digital watermarks. One type of covert security feature is the printing of information (images, designs, logos, patterns, text, etc.) in a material that is not visible under normal lighting conditions, but can be viewed using a special non-visible light source, such as an UV or IR light source. Use of UV and/or IR security features can be advantageous because although the devices (for example, UV and/or IR light sources) required to see and use such features are commonly available at a reasonable cost, the ability to manufacture and/or copy at least some implementations of such features is far less common and can be very costly. UV and IR based covert security features thus can help deter counterfeiters because the features cannot be copied by copiers or scanners and are difficult to manufacture without the requisite know-how, equipment, and materials.

Many images, such as color images, are formed by subtractive techniques, e.g., light is passed through absorbing dyes and the combination of dyes produce an image by sequentially subtracting cyan, magenta, and yellow components to provide the full color image. In the case of a UV fluorescing image, the UV image is formed by light emitting from fluorescing dyes or pigments as they are activated by a UV light or energy source. A UV image can be imparted to an ID document via methods such as thermal transfer or D2T2.

Regardless of whether the UV materials are imparted via D2T2 or mass transfer panel, both panels produce transmissive images—the mass transfer panel produces a bitonal (e.g., two tone) image and the dye sublimation panel produces a monochromatic (or shaded) image.

Color shifting and other optically variable pigments, inks, dyes, and colorants (collectively "optically variable media") have a feature of appearing to change color or reflectance as the viewing angle of an observer changes (or as the angle of incident light striking the media changes). Optically variable media have been used on security documents, such as identification cards, credit cards, checks, title documents, currency, etc. Some optically variable media exhibit a high degree of reflectivity at one angle (e.g., directly reflected light) and a low degree of reflectivity or translucent appearance at other angles (e.g., obliquely reflected light or diffuse light). In some examples, The optically variable property provides several advantages when used on security documents: (a) the presence and appearance of optically variable quality provides another "check" or method to authenticate the security document; (b) optically variable media are generally more difficult for a layman to obtain and use properly, thus helping to prevent (or at least limit) forgery and to make forgeries and/or alteration easier to detect; and (c) photocopiers and scanners generally will not reproduce many types of optically variable media, helping to reduce unauthorized reproduction or counterfeiting of such documents.

In some examples, optically variable media can be applied to security documents. For example, one type of optical variable media includes a plurality of relatively small particles (typically flakes or rods) that have specific optical properties dispersed in a medium (e.g., paint or ink). In one example, a security document includes a plurality of thin film layers, each film having a particular color and/or optical property. In some cases, media having optically variable properties include particles comprising flat, irregularly shaped mica platelets coated with titanium dioxide and/or iron oxide. These particles, when dispersed in media, can give a generally "pearlescent" effect, with smaller particles producing a "satin" effect and larger particles producing a "glitter" effect. In many instances, optically variable media are incorporated into a material such as a laminate layer or overlaminate layer, providing an optically variable indicia that overlays other information on the card. Generally, such an optically variable indicium contains "fixed" or "invariable" data (information that is the same from ID document to ID document).

In some examples, it is advantageous to print variable or personal UV information at the time of ID document personalization, in one, two, or three UV colors, especially images that have a high enough quality to be used for authentication and/or identification. It is also advantageous if the same information is printed in a visible and invisible (e.g., UV) form at substantially the same time or at substantially the same printing step, where the covert image would be "identification quality."

In some examples, as described herein, an optically variable ghost image can be printed using optically variable media. An optically variable ghost image can have an appearance that is analogous to a photographic "inverse" or "negative" of the visible ghost image. This may be referred to as one type of a "mirror-like image," although, of course, "true" mirror images of a given image, such the image of a face reflected from an actual mirror, in fact show a backwards image. One reason this may be referred to as a "mirror-like" image, for at least some embodiments, is because at least some of the optically variable inks used to print the optically variable ghost image create a "mirror-like" sheen or luster when printed. Another reason this is referred to as a "mirror-like" image, for at least some embodiments, is the reflective quality of the image. Yet another reason this is referred to as a "mirror-like" image is because, in at least some embodiments, the image can have an appearance that is similar is a photographic inverse or negative of the visible image, except printed using optically variable media.

Figure 2:
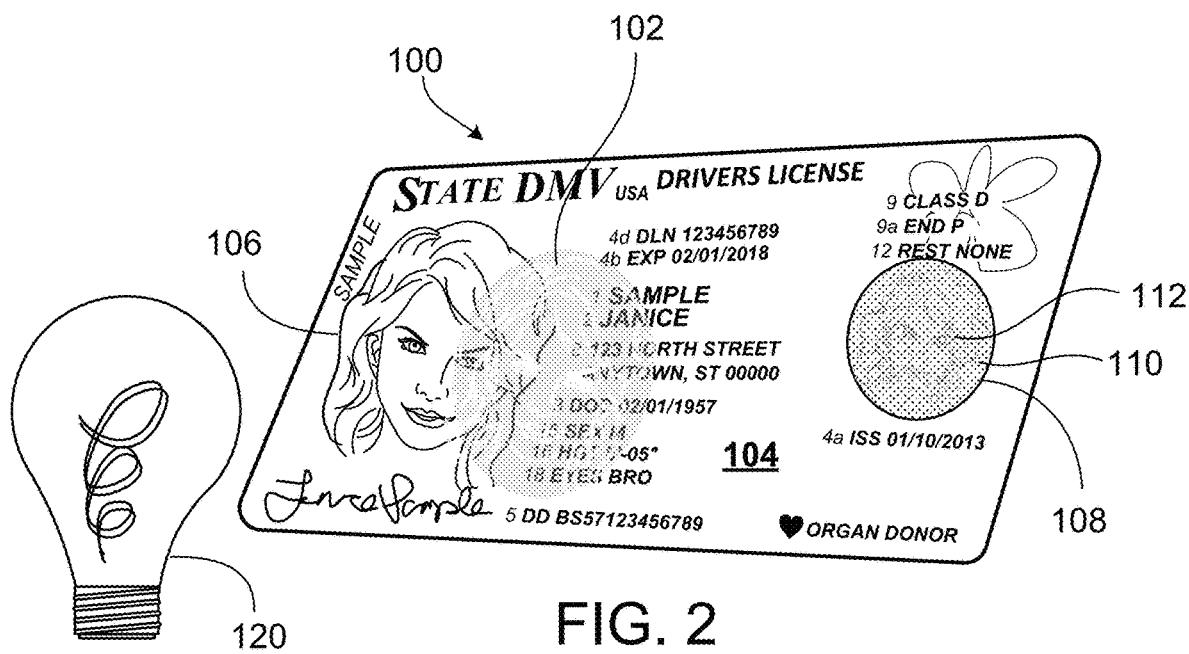
FIG. 2 depicts the ID document of FIG. 1 viewed from the front at an angle.

FIG. 1 depicts an exemplary ID document 100 with an optically variable ghost image 102 viewed from the front 104 in reflected light. FIG. 2 depicts the ID document 100 viewed from the front 104 at a different angle from that shown in FIG. 1. As depicted, the optically variable ghost image 102 is an image or "ghost" version of portrait 106, however, the optically variable ghost image 102 can be an image of other ID information or other personal credentials. When viewed from a first angle (e.g., in directly reflected light) the optically variable ghost image 102 has a first visual appearance and when viewed from a second angle (e.g., in indirectly reflected light) the optically variable ghost image 102 has a second visual appearance. For example, when viewed from a first angle (e.g., in directly reflected light) the optically variable ghost image 102 is visible and appears as a highly reflective "positive" image (e.g., as shown in FIG. 1). When viewed from a second angle (e.g., in indirectly reflected light as shown in FIG. 2) the optically variable ghost image 102 appears less reflective or even translucent, and, in some examples, may give the appearance of a "negative" image. That is, optically variable ghost image 102 is visible in reflected light at greater and lesser intensity based on angle of reflection.

As depicted in FIG. 2, the optically variable ghost image 102 is less visible at the angle of reflection in FIG. 2 than at the angle of reflection in FIG. 1. Tilting ID document 100 in reflected light causes optically variable ghost image 102 to appear more or less visible, and, in some examples, causes the optically variable ghost image 102 to appear as a "negative" image.

In some examples, the optically variable ghost image 102 can be used to overlap over a significant portion of a corresponding portrait 106, thereby linking and layering with that feature. In some examples, close alignment of the optically variable ghost image 102 to a corresponding portrait 106 is optional. In some examples, an optically variable ghost image 102 can be applied so as to partially overlay a variable indicium on the ID document 100, and the variable indicium need not be the same indicium as the optically variable ghost image 102. In some examples, an optically variable ghost image 102 can be applied to an ID document so that it does not overlay a variable indicium on an ID document 100.

In some examples, an optically variable ghost image 102 can be applied to an area of an ID document 100 that does not contain information that would interfere with its appearance. This may permit the ghost image 102 to be printed in such a way that it is possible to obtain an appearance of a "flipping" image when the ID document 100 is viewed at different angles. For instance, the optically variable ghost image 102 may have the appearance of flipping between a "positive" image (e.g., as shown in FIG. 1) and a "negative" image (e.g., as shown in FIG. 2). More specifically, applying the optically variable ghost image 102 to an area of the ID document 100 that has no or minimal interfering features may accentuate the appearance of the ghost image 102 as a "negative" image. The area need not be a substantially blank area of the ID document 100; for example, the area could contain fixed indicia such as background colors, fine line printing, artwork, scrolls, etc.

The optically variable ghost image 102 is constructed by the use of mass transfer of materials (e.g., optically variable media) that reflect light in various ways. For example, the optically variable media change color or reflectance as the angle of incident light changes with respect to a viewing angle of an observer is changed. More specifically, optically variable media can give the optically variable ghost image 102 a highly reflective appearance at one angle (e.g., directly reflected light), but a minimally reflective or translucent appearance at another angle (e.g., indirectly reflected or scattered light).

Because the mass transfer materials used to create the optically variable ghost image 102 reflect incident light to produce an image instead of absorbing light as most dyes, the optically variable ghost image 102 is transferred to the ID document as a "negative" image in order to produce an appearance of a "positive" image on the ID document. As described in more detail below and with reference to FIG. 4, the optically variable ghost image 102 can be digitally generated from a greyscale or color image (e.g., portrait 106). The optically variable ghost image 102 can be applied as a bitonal or halftone image. More specifically, the optically variable ghost image 102 is made up of areas in which optically variable media is applied to an ID document and areas in which the optically variable media is not applied. The areas in which the optically variable media are applied appear bright in directly reflected light, thereby, giving the appearance of a "positive" image (e.g., as shown in FIG. 1). In diffuse or indirectly reflected light, the areas in which the optically variable media are applied appear dim or translucent, thereby, becoming less perceptible or, in conjunction with the background of the ID document 100, giving the appearance of a "negative" image (e.g., as shown in FIG. 2).

Figure 3:
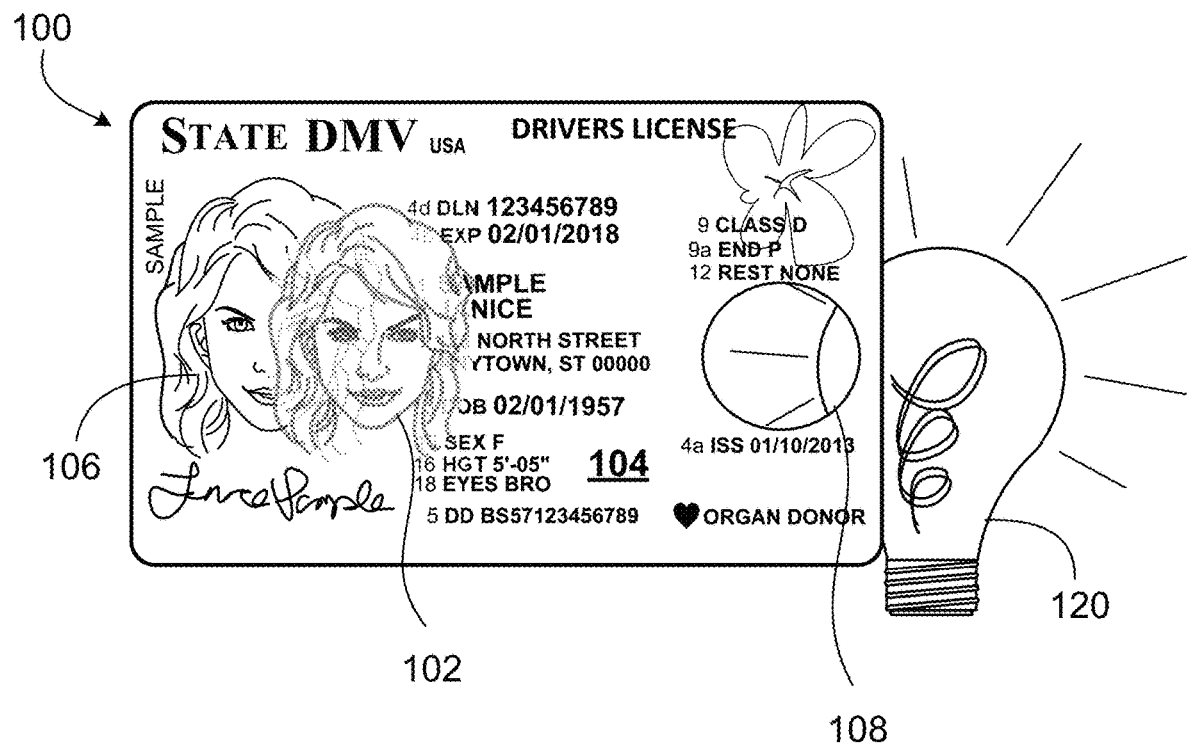
FIG. 3 depicts the ID document of FIG. 1 viewed from the front with light transmitted through a dynamic window from the back to the front of the ID document.

In another example, the optically variable ghost image 102 can be used in conjunction with an optical window 108 of the ID document 100 by using the optical features of both the ghost image and an optically functioning window 108. For example, as depicted, the window 108 is circular, but may be any shape (e.g., elliptical, rectangular, square, irregular, etc.). The window 108 has coating 110. Coating 110 is an optically variable coating 110 (e.g., a coating 110 of optically variable media). The window 108 has a first visual characteristic when viewed from front 104 of ID document 100 in reflected light and a second visual characteristic when backlit (i.e., viewed from front 104 with light transmitted through the window 108 from the back (not shown) toward front 104). When viewed in reflected light, the prime light source 120 is on the same side of ID document as the viewer (e.g., as shown in FIGS. 1 and 2). When backlit, the prime light source 120 is on the opposite side of the ID document as the viewer (e.g., as shown in FIG. 3). The first visual characteristic and the second visual characteristic are distinguishable with the unaided human eye. The appearance of window 108 may vary, for example, based on the properties of coating 110 as well as a function of the location of the prime light source 120. In some cases, window 108 may exhibit a special effect (e.g., gold metallic or silver metallic) based upon coating 110 the dynamic window's 108 coating 110. As used herein the prime light source 120 refers to a light source that provides light most directly incident on the window 108, as opposed to more diffuse lighting.

More specifically, when viewed from front 104 of ID document 100 in reflected light, window 108 has a first visual appearance (e.g., window appears colored, opaque, reflective, metallic, or the like). In one example, the window 108 has a gold appearance when viewed in reflected light. When ID document 100 is viewed from the front 104 in backlight (e.g., light transmitted through the window 108 from the back to the front 104 of the ID document 100), the window 108 becomes substantially transparent. For example, the coating 110 on the window 108 may reflect a sufficient portion of incident light from a prime light source 120, so as to appear opaque to reflected light, yet permit a sufficient portion of incident light to be transmitted so as to appear transparent to transmitted light from the prime light source 120.

In yet another example, an optically variable ghost image 112 can be applied to the window 108. For example, the window 108 can have a coating 110 with a gold appearance (in reflected light) while the optically variable ghost image 112 can have a silver appearance in reflected light. The combination will appear differently than if the optically variable ghost image 112 is located on other sections of the ID document 100. Thus, as shown in FIG. 1, when viewed from front 104 of ID document 100 in directly reflected light, the coating 110 applied to the window 108 appears as gold background for a silver optically variable ghost image 112. When the ID document 100 is viewed from back in reflected light, window 108 has the same appearance as when viewed from front 104 in reflected light; however, the optically variable ghost image 112 may not be visible. That is, when viewed from the back in reflected light, the window 108 has the same appearance as when viewed from front 104 in reflected light, but coating 110 obscures the optically variable ghost image 112 such that it is not visible.

As depicted in FIG. 2, optically variable ghost image 112 is less visible at the angle of reflection in FIG. 2 than at the angle of reflection in FIG. 1. In other words, tilting ID document 100 in reflected light causes optically variable ghost image 112 to appear more or less visible, and also causes the coating 110 in window 108 to appear more or less muted.

FIG. 3 depicts the ID document 100 viewed from the front with light transmitted through a window 108 from the back to the front 104 of the ID document 100. In other words, FIG. 3 depicts the ID document 100 viewed such that the ID document 100 is between the viewer and the prime light source 120. As seen in FIG. 2, window 108 has a second visual appearance, which is different from the first visual appearance as depicted in FIGS. 1 and 2. That is, window 108 appears to be transparent. In other words, the coating 110 and the optically variable ghost image 112 become transparent to transmitted light. More specifically, the optical variable media applied to the window 108 to create the coating 110 and the optically variable ghost image 112 allow a sufficient portion of incident light from the prime light source 120 to be transmitted, thereby, giving the appearance that the coating 110 and the optically variable ghost image 112 are transparent to transmitted light.

In another example, the optically variable ghost image 112 may be applied to the window 108 without the coating 110. In such cases, the optically variable ghost image 112 would be visible when viewed from either the front 104 or back in reflected light, but not visible from either side when viewed in backlighting. In other words, when the optically variable ghost image 112 is applied over the window 108 alone without a coating 110, the optically variable ghost image 112 is visible in reflected light, but not in transmitted light.

In some examples, the optically variable ghost image 102 or 112 is responsive to UV or IR light. In one example, optically variable ghost images 102 or 112 has a blue glow under UV light. For example, an optically variable ghost image 102 or 112 can be applied to an ID document 100 using UV or IR responsive optically variable media.

In some examples, the effects of the optically variable media used for optically variable ghost images or dynamic window coatings can be enhanced. For example, materials such as metallic oxides and high refractive index (HRI) materials can be incorporated with the optically variable media. In some examples, an HRI film can be applied to the optically variable media in increase the irradiance of optically variable ghost images or dynamic window coatings.

In some examples, an ID document 100 can include a temperature sensitive insert, such that the insert changes color when warmed by a hand or finger. An optically variable ghost image 102 can be used to overlap a significant portion of the temperature sensitive insert, thus changing the optical nature of the ghost image that is viewed on the insert.

In some examples, an ID document 100, includes a covert image. A covert image may also correspond to image 102, and may not be visible under "normal" viewing conditions. In some implementations, a covert image is an UV image, meaning that it glows (e.g., visibly fluoresces or emits radiation) in response to appropriate UV stimulation. In some implementations, a covert image fluoresces in the UV spectrum upon excitation with visible light. A covert image may be generally imperceptible under normal (e.g., non-ultraviolet or non-angled) viewing conditions.

In some implementations, a covert image is an infrared IR image, meaning that it glows (e.g., visibly fluoresces or emits radiation) in response to appropriate IR stimulation. In some implementations, a covert image is a thermachromic image, meaning that it becomes visible only when the image (or entire ID document 100) is subject to a predetermined change in temperature, such as by heating or cooling. In some implementations, a covert image is an optically variable image, meaning that the covert image is most visible when viewed at a particular angle. In some implementations, a covert image is formed using a material such as a ferrofluid (available from FeroTec of Nashua, N.H.). Ferrofluids are responsive to magnetic fields, and can be used to produce covert images that become visible when an appropriate magnetic field is applied to the ferrofluid.

In some implementations, a covert image is a combination of any one or more of UV, IR, thermachromic, ferrofluidic, and/or optically variable images. For example, a covert image can be both a UV and a thermachromic image by printing the card area, using the methods described herein, with both UV and thermachromic inks, meaning that when subject to appropriate stimulation, the normally "blank" area of the card will display either a UV image (if appropriate UV stimulation is provided) or a thermachromic image (if appropriate temperature is provided). Those skilled in the art will appreciate that many combinations are possible. It is even envisioned that combination type inks, such as UV thermachromic inks (meaning inks that, to display an image, require both UV and appropriate temperature), the methods described herein will be usable with such inks.

In some implementations, a steganographic code is embedded into a covert image. One form of steganographic encoding is digital watermarking. Digital watermarking is a process for modifying physical or electronic media to embed a machine-readable code into the media. The media may be modified such that the embedded code is imperceptible or nearly imperceptible to the user, yet may be detected through an automated detection process. In some implementations, the ID document 100 includes two or more digital watermarks.

Digital watermarking systems typically have two primary components: an encoder that embeds the digital watermark in a host media signal, and a decoder that detects and reads the embedded digital watermark from a signal suspected of containing a digital watermark (a suspect signal). The encoder embeds a digital watermark by altering the host media signal. The reading component analyzes a suspect signal to detect whether a digital watermark is present. In applications where the digital watermark encodes information, the reader extracts this information from the detected digital watermark. The reading component can be hosted on a wide variety of tethered or wireless reader devices, from, for example, cameras in communication with a computing device or fully mobile readers with built-in displays. By imaging a watermarked surface of the card, the watermark's "payload" can be read and decoded by this reader.

In some implementations, a digital watermark may be embedded in a covert image. For example, if the covert image is a printed UV image. A watermark detector can read the covert UV watermark only if ID document 100 is subject to appropriate UV stimulation at the same time that the host ID document 100 is presented to the watermark detector. This provided additional security to the ID document 100, because even if a counterfeiter is able to access UV inks to print a bogus covert image, the bogus covert image will not contain the embedded digital watermark. Of course, mere photocopying or scanning of ID document 100 will similarly frustrate the counterfeiter, who will be unable to reproduce, through scanning or photocopying, either the covert image or the watermark contained therein.

In some implementations, the watermark embedded in a covert image may include a payload or message. The message may correspond, e.g., to the ID document number, printed information, issuing authority, biometric information of the bearer, and/or database record, etc. The watermark embedded in the covert image may also include an orientation component, to help resolve image distortion such as rotation, scaling and translation. In at least one implementation, two or more watermarks are embedded in the optically variable device (OVD) image.

In some implementations, the watermark embedded in a covert image corresponds to information printed on the ID document 100, or to information carried by a second watermark embedded elsewhere on the ID document 100 (e.g., a graphic or portrait 106, etc.).

In some examples, an ID document 100 can also have one or more of the following features: Guilloche security design, micro-print, microprint with deliberate error, security indicia, laser perforation, split fountain printing, IDMARC, variable micro-script, altered font, overlapping data, UV printed variable data, redundant data, one-dimensional bar code, two-dimensional bar code, tri-color optically variable device, magnetic stripes, digital watermarks, and biometric information (e.g., fingerprint, etc.). Each of these features, along with the positioning or embedding of the features, is optional.

Figure 4:
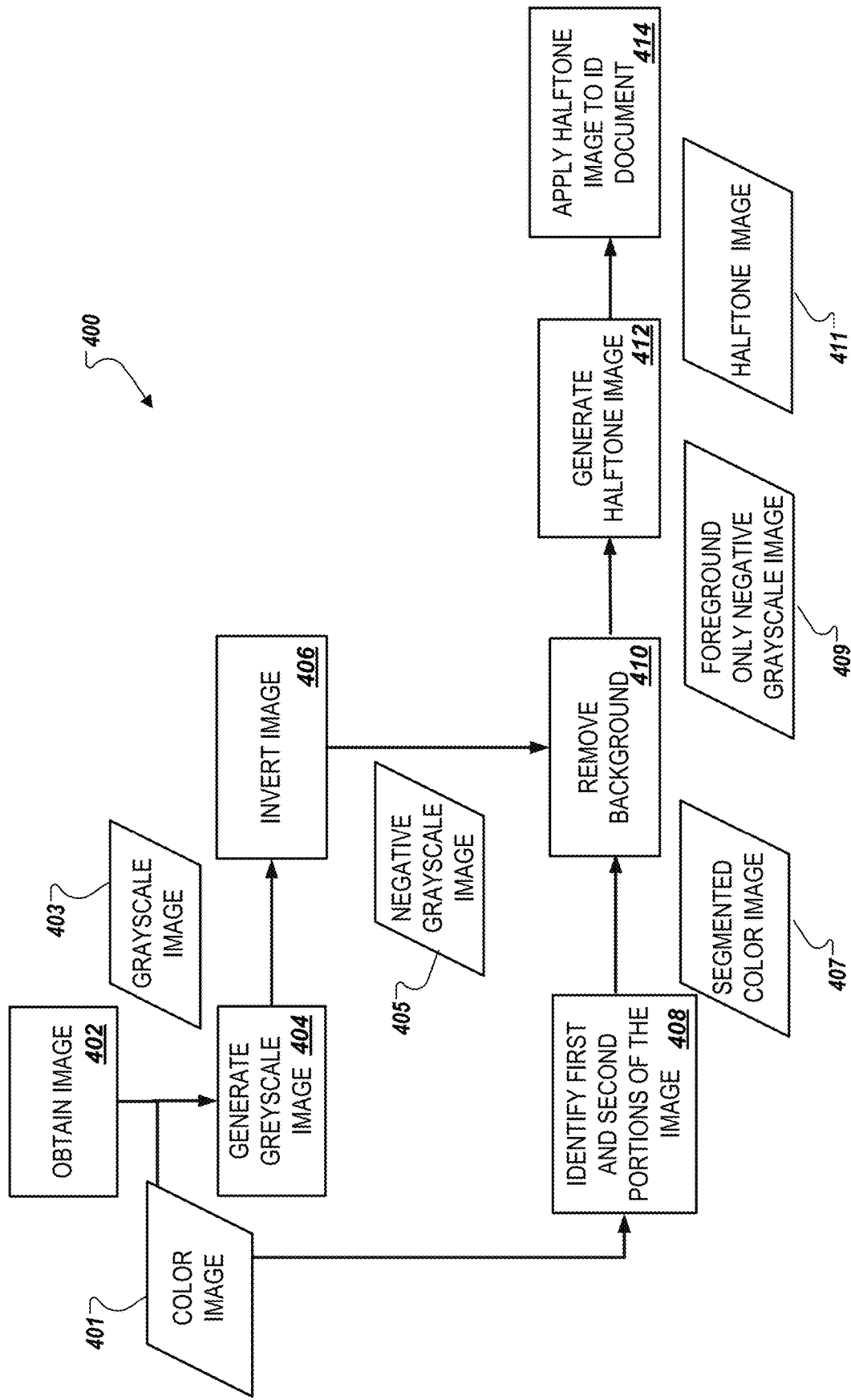
FIG. 4 depicts a flowchart of an exemplary process for generating an optically variable ghost image on an ID document.

Methods for printing an optically variable image of variable data (e.g., data that can differ from card to card) onto the ID document, where the optically variable image has a metallic, iridescent, pearlescent, or "mirror-like" sheen or luster at a particular viewing angle, but which still enables the indicia to be perceived at the particular angle. The optically variable indicia is essentially invisible when the ID document is viewed from angles other than the particular angle. This optically variable image can comprise any type of indicium: images (e.g., a photograph), characters (e.g., a birthdate), graphics, etc. In particular, this optically variable image can comprise personalized data (e.g., data specific to a particular holder of an ID document or specific to a group of ID documents). In some implementations, an optically variable image is printed at the time of card personalization using a specially configured ribbon adapted for D2T2 and/or mass transfer printing. marker for resuming review FIG. 4 depicts a flowchart of an exemplary process 400 for generating an optically variable ghost image on an ID document that can be executed in accordance with implementations of the present disclosure. In some implementations, the process 400 can be realized using one or more computer-executable programs that are executed using one or more computing devices. In some implementations, the process 400 can be executed using one or more computing devices to control identification document printing equipment.

An image 401 is obtained (402). For example, the image 401 can be a color or grayscale image. The image 401 can be, for example, an image of the cardholder (e.g., a portrait), an image of a building (e.g., a state capital), or an image of textual information (e.g., an ID number or a security code). The image 401 can be obtained from an ID issuing authority (e.g., a state department of motor vehicles), cardholder database or a cardholder's application for an ID (e.g., driver's license or passport application). In some examples, the image 401 can be an image of personalized credential information (e.g., information that is specific to an ID cardholder, such as a portrait). In some examples, the image 401 can be specific to an ID issuing authority (e.g., an image of a capital building).

The image 401 is, optionally, converted to a grayscale image 403 (404). For example, if the image 401 was obtained as a color image, the color image 401 can be converted to a grayscale image 403. The greyscale image 403 is inverted (406). For example, a "negative" greyscale image 405 can be generated. For example, the pixel values of the greyscale image can be inverted. In other words, for an 8-bit image a pixel value of 255 can be inverted to become 0, or a pixel value of 55 can be inverted to become 200. In some examples, the bits of each pixel in the greyscale image 403 can be complemented (e.g., 00110111b (55) becomes 11001000b (200)).

In addition, a first portion and a second portion of the image 401 (color or grayscale) are identified (408). For example, the first portion may correspond to the foreground object in the image (e.g., a portrait or face of a cardholder), and the second portion may correspond to the background of the image 401 or other objects in the image 401. For example, the image 401 can be segmented to produce a segmented image 407. For example, segmenting the image 401 can distinguish the background of the image 401 from an object in the image that is to be used for the optically variable ghost image. For example, an object detection algorithm can be performed on the image 401 to detect an object (e.g., a face in a portrait or a budding) and segment the objects in the image 401. For example, a boundary contours of between the object and the background in the image can be detected and delineated (e.g., based on color, contrast, or user selected contours), thereby, segmenting the object from the background and other objects in the image 401. In some examples, a facial detection algorithm can be used to segment a cardholders face in a portrait of the cardholder.

The background is removed (410) from the "negative" greyscale image 405 yielding a modified "negative" greyscale image 409 (e.g., foreground only "negative" greyscale image). For example, the segmented image 407 can be used to identify and remove the background in the "negative" greyscale image 405. In some examples, the pixels in the background segment(s) of the segmented image 407 can be mapped to corresponding pixels in the "negative" greyscale image 405 to identify the background pixels in the "negative" greyscale image 405. In some examples, the segmented image 407 serves as a mask for removing the background from the "negative" greyscale image 405. The background pixels in the "negative" greyscale image 405 can be removed from the image. In some examples, the background pixels are removed or made transparent. In some examples, the background pixels are assigned a value identifying them as pixels background pixels such that they will not be printed. The resulting modified "negative" greyscale image 409 can include only a "negative" greyscale image of the desired object. In other words, the resulting modified "negative" greyscale image 409 can include only the object of which the an optically variable ghost image is to be generated (e.g., a cardholder's portrait).

A halftone image 411 is generated (412) from the modified "negative" greyscale image 409. For example, the halftone image 411 can be generated by applying dithering techniques to a bitonal representation of the modified "negative" greyscale image 409. Dithering techniques can include, for example, Floyd-Steinberg dithering, Atkinson dithering, Sierra dithering, Sierra Lite dithering, etc. In some examples, the halftone image 411 can be a frequency modulated halftone image. For example, a dot size in the halftone image 411 may remain constant (e.g., the size of a D2T2 printhead (1/300 inch)) while the dot frequency is varied to generate the appearance of shading in the halftone image 411. In some examples, the halftone image 411 can be an amplitude and frequency modulated halftone image. For example, the dot size and dot frequency can be varied to generate the appearance of shading in the halftone image 411.

The halftone image 411 is applied to an ID document (414). For example, the halftone image 411 can be used as a master image to control a mass transfer process for applying an optically variable ghost image on an ID document. For example, a D2T2 ribbon material can be prepared to allow mass transport of pixels of material that reflect light in certain angles and not in other angles. In some examples, this can be done in desktop printers by altering panels such as the K panel or an UV panel. It can also be used in large machines that produce a multiplicity of cards (e.g., thousands of cards) in a single shift by formatting ribbon material and printing in the same manner as in desk top printers.

The optically variable image at the time of card personalization may be printed using a specially configured ribbon adapted for D2T2 and/or mass transfer printing. In one example, a D2T2 ribbon material that allows mass transport of pixels of material that reflect light in certain angles and not in other angles. More specifically, a transfer layer can be developed on a carrier web of a transfer ribbon (e.g., in a standard D2T2 ribbon or on a separate single ribbon available in larger printers such as the Muhlbauer). This layer may be, for example, a thermal transfer coating that contains optically variable media such as pearlescent particulates/pigments. The particulates, pigments, or both may be used in a variety of colors, such as silver, gold, blue, etc. Suitable transfer binders includes any polymer that allows incorporation of the pigments and is transparent and bonds well to the card surface in printing.

In some examples, a thermal transfer coating is formed from a dispersion that contains an optically variable inorganic pigment, a solvent, a binder, and is formulated to achieve a viscosity suitable for printing in a thermal printing process (e.g., at least 50 wt % solvent, at least 10 wt % binder, and at least 10 wt % pigment; or 50-70 wt % solvent, 10-25 wt % binder, and 10-25 wt % pigment). The inorganic pigment generally includes particles such as rod-shaped particles or structured thin metallic platelets (e.g., flakes) that act as mirrors. The optical intensity of the platelets changes according to the angle from which they are viewed. Maximum light intensity is achieved near the angle at which the incident light is totally reflected. Minimum light intensity is experienced at an angle far away from total reflection. After the dispersion is applied to the substrate (e.g., a transfer ribbon or dye diffusion panel), the solvent evaporates and the particles align on the substrate and are immobilized in the binder, yielding aligned particles in a film on the substrate. In one example, the remaining binder and pigment that form the thermal transfer coating have a resulting weight ratio of between 2.5:1 and 0.4:1 binder to pigment.

Examples of suitable solvents include ketones, aliphatic or cyclic ethers, and acetates, such as ethyl acetate, propyl acetate (e.g., n-propyl acetate), butyl acetate (e.g., n-butyl acetate), and the like. Examples of suitable binders include PVCs, vinyl acetates, and copolyester resins (e.g., VITEL copolyester resins available from Bostik, such as VITEL 2700B LMW and VITEL 5833B, and the like) that are soluble in the solvent. Examples of suitable inorganic pigments include IRIODIN/AFFLAIR 103 Rutile Sterling Silver (available from EMD Chemicals) and FLAMENCO Gold 220C (available from BASF). IRIODIN/AFFLAIR 103 Rutile Sterling Silver is a pearlescent silver pigment comprised of mica-based flakes coated with a thin layer of metal oxides (e.g., $TiO_2$ and $SnO_2$). FLAMENCO Gold 220C is a pearlescent gold pigment that includes mica and $TiO_2$. The interplay of colors produced by these pigments is due to the layered structure of the metal oxides, which is also imparts a rich, deep glossy effect. Particle sizes ranging from about 10 to about 60 microns are suitable for digital thermal printing ribbon application described herein (e.g., 300 dpi). In one example, a thermal transfer coating is formed from a dispersion that includes 10 wt % ethyl acetate, 48 wt % n-propyl acetate, 10 wt % n-butyl acetate, 19 wt % VITEL 2700B LMW, and 13 wt % IRIODIN/AFFLAIR 103 Rutile Sterling Silver. In this example, after solvent evaporation the remaining VITEL 2700B LMW to IRIODIN/AFFLAIR 103 Rutile Sterling Silver weight ratio is between 1.7:1 and 1.3:1 VITEL 2700B LMW to IRIODIN/AFFLAIR 103 Rutile Sterling Silver.

In some examples, printing with such ribbons can be achieved in desk top printers by alternating panels such as a K panel or a UV panel, or in large machine that produces a multiplicity (e.g., thousands) of cards in a single shift by formatting ribbon material (e.g., utilizing 'mono' ribbons of dye diffusion and also of K, UV and Optically varying pigments) and printing in a manner similar to that of desk top printers. A wide range of suitable mass transfer materials is available, thus allowing a vast array of effects.

In some examples, the transfer layer can house IR or UV particulates, dyes, pigments, or a combination thereof that give the transferred pixels IR or UV functionality in addition to their optical function. In some examples, the effects of the optically variable media can be enhanced by vacuum deposition of other materials to the transfer layer. For example, materials such as metallic oxides or HRI materials may increase the irradiance in the transferred optically variable media. The transfer layer function can also be amplified by incorporation of a combination of elements or compounds that have light functioning characteristics, such as color shifting functionality, or glitter via dispersion of a variety of metallic materials.

Figure 5:
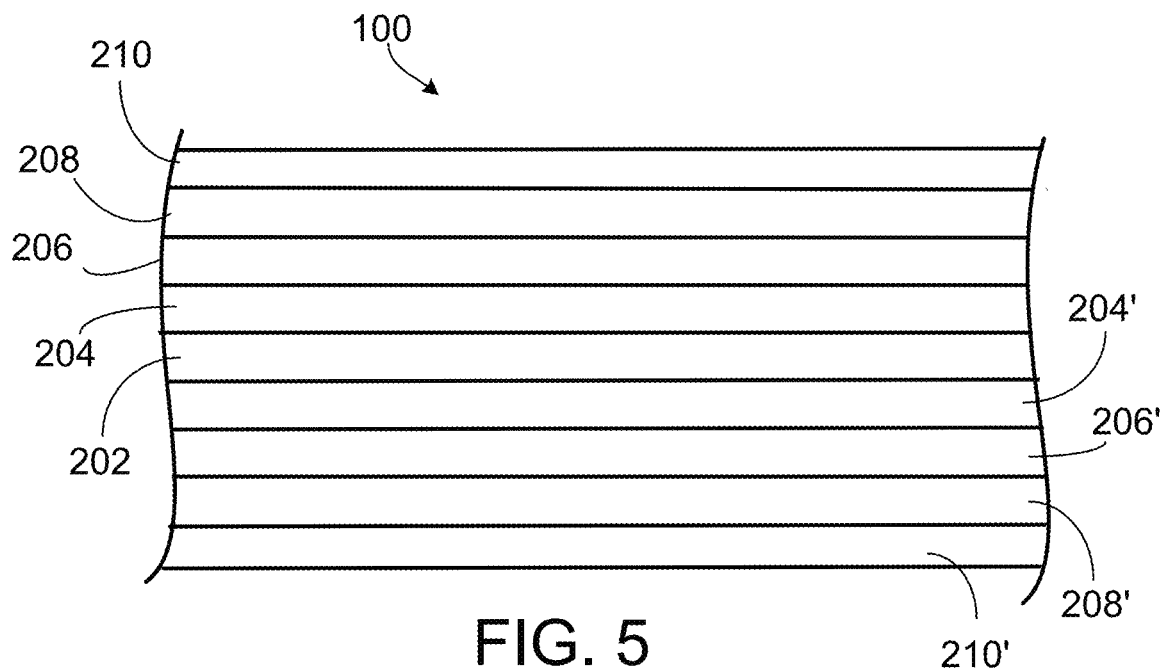
FIG. 5 is a cross-sectional view of the ID document of FIG. 1 taken through line A-A.

FIG. 5 is a cross-sectional view of ID document 100 taken along line A-A of FIG. 1. ID document 100 includes core layer 202, tie layers 204, 204' on either side of the core layer, and structural layers 206, 206' on the outer side of tie layers 204, 204', respectively. Core layer 202 is opaque, houses the dynamic window, and may be preprinted on one or both sides (e.g., with invariable data). One or more of tie layers 204, 204' may also be preprinted, engraved, or both. Tie layers 204, 204' typically include multiple co-extruded layers and promote bonding between core layer 202 and structural layers 206, 206'. Structural layers 206, 206' provide durability as well as stiffness and flatness. Tamper-evident (TE) patterns may be coated onto structural layers 206, 206' via gravure. After assembly (e.g., manually or via machine), core layer 202, tie layers 204, 204', and structural layers 206, 206' are laminated in a platen lamination process to yield card blank 208, formed in the absence of adhesive compositions. The platen lamination process facilitates debossing, as well as the flatness, superior surface finish, and desired polish for card blank 208.

Receiver layers 210, 210' may be coated on the outer side of each structural layer 206, 206', respectively, and may be bonded to the structural layers via solvent dissolution, thereby becoming part of the structural layers. Tamper-evident patterns may be coated on an underside of one or more of receiver layers 210, 210'. Receiver layers 210, 210' allow good image replication (e.g., via D2T2) as well as debossing. Patterns formed by plate debossing go through the D2T2 receiver layer and into the structural layer underneath, thereby providing protection of the image, photo, or text (as applicable) from tampering or counterfeiting. Overlaminate layers 212, 212' may be coated on receiver layers 210, 210', respectively, after personalization. Overlaminate layer 212 represents front 106 of ID document 100, and overlaminate layer 212' represents back 108 of the ID document. Receiver layers 210, 210' and overlaminate layers 212, 212' are not considered to be part of the card blank. Thus, card blank 208 has five layers, including core layer 202, tie layers 204, 204', and structural layers 206, 206'.

Core layer 202 is typically opaque. Suitable materials for core layer 202 include white poly(vinyl chloride) (PVC), polyester, polycarbonate, polystyrene, and the like. TESLIN and other polymers that are capable of z-axis tear out and are immiscible with other polymers are typically not suitable for core layer 202. A thickness of core layer 202 is typically in a range of 5 to 10 mil (about 125 to 250 μm). Fixed indicia may be printed (or pre-printed) on core layer 202. The core layer in at least some embodiments is formed using a material adapted to be printable or markable (e.g., by laser marking) using a desired printing/marking technology. Materials that are printable can include, as an example, materials such as polyolefin, polyester, polycarbonate (PC), PVC, plastic, polyethylene terephthalate (PET), polyethylene terephthalate glycol-modified (PETG), polyethylene terephthalate film (PETF), and combinations thereof. However, materials that can split in the z-axis are typically not suitable. Many other materials are, of course, suitable, as those skilled in the art will appreciate. In an advantageous embodiment, core layer 202 is substantially opaque, which can enable printing on one side to be not viewable from the other side, but opacity is not required. In some embodiments, it may, in fact, be advantageous that core layer 202 be substantially transparent. The color of the core layer 202 may vary, but in an advantageous embodiment the core layer is colored to provide a good contrast with indicia printed (or otherwise formed) thereon. In one example, core layer 202 is light in color, thereby allowing good contrast with dark indicia. In another example, core layer 202 is dark in color, thereby allowing good contrast with light indicia.

Tie layers 204, 204' typically include multiple layers of chemically modified resins with reactive moieties (e.g., isocyanates) attached to the base resin. The reactive moieties in an outer layer of a tie layer are selected form covalent bonds with the layer in contact with the tie layer during lamination. Suitable materials for tie layers 204, 204' are compatible with other materials in the ID document and include PETG and PC. A thickness of tie layers 204, 204' is typically in a range of 2 to 6 mil (about 50 to 150 μm). Thickness, composition, or both of tie layers 204 and 204' may be the same or different. In some cases, a laser engraved image (e.g., a hologram or KINEGRAM) is formed in one or more of tie layers 204, 204' (e.g., in tie layer 204). The laser engraving may be such that the dynamic window in core layer 202 is not affected by the laser engraving (e.g., the optically variable coating on the dynamic window is not ablated or removed by the laser engraving).

Suitable materials for structural layers 206, 206' include PC, polyethers, polyphenoxides, polyphenols, polyesters, polyurethanes, and the like. Structural layers 206, 206' may be sensitized to accept laser engraving. A thickness of structural layers 206, 206' is typically in a range of 2 mil to 10 mil (about 50 μm to about 250 μm). Thickness, composition, or both of structural layers 206, 206' may be the same or different.

Suitable materials for receiver layers 210, 210' include PC (e.g., non-sensitized), coated with, for example, modified PVC with antioxidants. The receiver coating allows good image replication and using deboss patterns promotes protection of printed features (e.g., images, text) from tampering, counterfeiting, or both. A thickness of receiver layers 210, 210' is typically in a range of 4 to 10 mil (about 100 to about 250 μm). Thickness, composition, or both of receiver layers 210, 210' may be the same or different.

If two adjacent layers are made of substantially the same material (e.g., polycarbonate), they may be laminated together into a single structure, as understood by those skilled in the art. Similarly, if a laminate and an overlaminate are both made of the same material (e.g., polycarbonate), they can be laminated into a single structure.

If the laminate is made of a material (e.g., PET) that is not itself capable of being imaged using a given printing or marking technology (e.g., D2T2), layers or coatings may be applied to the laminate to make it printable and/or markable. For example, in one embodiment, the laminate is coated with a coating that enhances absorption of laser energy. In another example, an image receiving layer that improves D2T2 printing is applied to the laminate. Variable data (e.g., signature, ghost image, fingerprint, etc.) may be printed a receiver layer, such as by D2T2, mass transfer printing, and/or laser engraving. In one implementation, optically variable indicia of variable data are formed on the laminate by printing the laminate with a conventional D2T2 YMC type of ribbon modified by the addition of a panel containing a thermally transferable thermally transferable optically variable pigment, such as ink or dye.

A window in an ID document described herein, such as dynamic window 102 in ID document 100, may be formed by defining an opening in the core layer (e.g., dye cutting the core layer) and positioning a plastic layer having the same dimensions as the opening and the same thickness as the core layer in the opening, such that the plastic layer is inlaid in the core layer. Suitable materials for the plastic layer include PC, PVC, PETG, and the like. The plastic layer is typically clear plastic having one or more optically functional coatings or devices (e.g., an optically variable coating, a metallic digitally mastered hologram, or both) on one or both sides. The optically functional coatings or devices may be applied to the plastic layer (e.g., before the plastic layer is positioned in the core layer) by methods known in the art, including sputtering, vacuum depositing, solution coating, and the like. Before or after application of the optically functional coatings or devices, the plastic layer is sized to fit in the opening in the core layer. The coated plastic layer is positioned in the opening in the core layer (e.g., as an insert) to yield the dynamic window.

Figure 6:
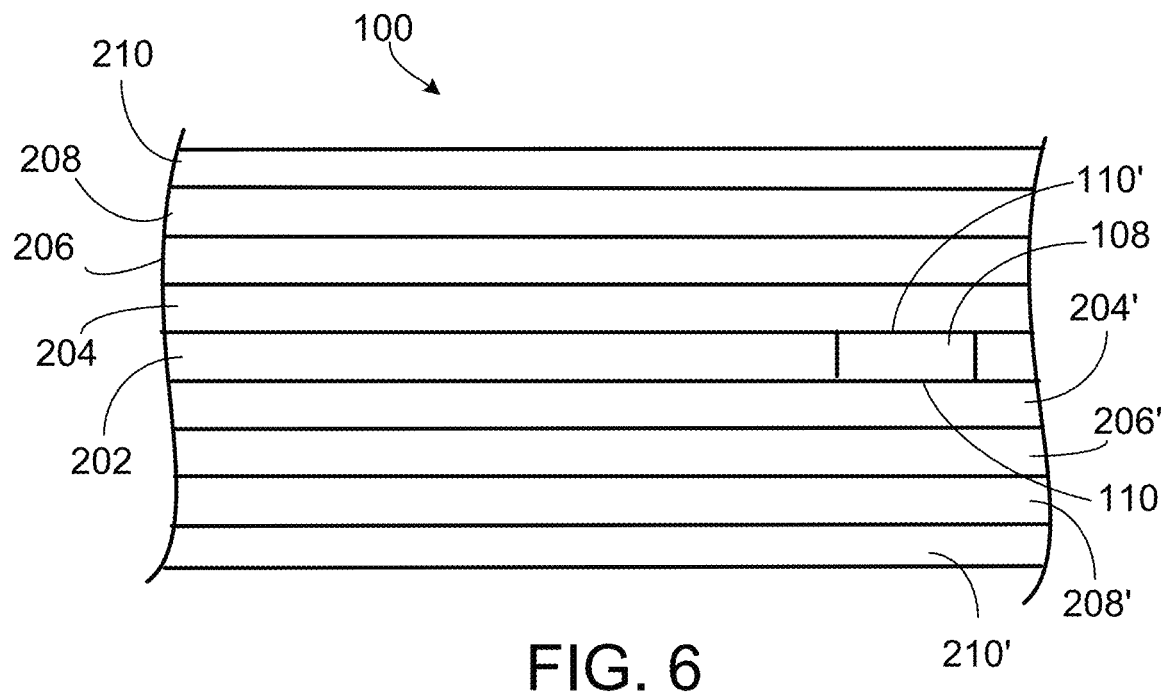
FIG. 6 is a cross-sectional view of the ID document of FIG. 1 taken through line B-B.

FIG. 6 depicts a cross-sectional view of ID document 100 along line B-B of FIG. 1. In one example, card blank 208 is formed by forming an opening in core layer 202 and positioning dynamic window 108 in the opening. In one example, dynamic window 108 formed from clear 6 mil (about 150 μm) plastic film (e.g., PC, PVC, PETG, or the like) with coating 110' on the side of dynamic window 108 facing front 104 of ID document 100, coating 110 on the side of dynamic window 102 facing the back of ID document 100, or both. Coatings 110 and 110' may be the same or different. In one example, coating 110 is gold and coating 110' is blue. As used herein, "coating 110, 110'" refers to coating 110, coating 110', or both. In some cases, coating 110, 110' may include a metallic digitally mastered hologram.

Dynamic window 108 is typically heat-stable, such that optical properties are maintained during lamination. In some cases, dynamic window 102 is laser sensitive, such that laser engraving may be used to engrave an image, text, or a combination thereof on the film. Dynamic window 108 may be laser sensitive to the exclusion of other components of ID document 100. In certain cases, a metallic KINEGRAM may be printed on dynamic window 108 and a laser (e.g., a YAG laser or $CO_2$ laser) may be used to laser write variable data into the dynamic window before fabrication of the card blank. In still other cases, an optically variable device (OVD) (e.g., a metallic KINEGRAM or hologram) may be printed on either side of dynamic window 102 or on another layer of the ID document and superimposed on either side of the dynamic window.

Fabricating card blank 208 corresponding to ID document 100 as described herein is achieved by assembling the layers of the card blank by hand or machine and plate laminating by pressure, heat, or both by methods and equipment generally known in the art (e.g., buckle laminators). Coating 110, 110' may be applied to dynamic window 108 before or after placement of the dynamic window in core layer 202. The dynamic window is typically held in the core layer by friction or ultrasonically welded in place. Thickness of an exemplary ID document is typically 30±3 mil (about 760±76 µm). These ID documents are generally fabricated to meet applicable ISO and AAMVA standards.

Coating 110, 110' is formed by application of a dispersion to the substrate used to form dynamic window 108. The dispersion typically includes an inorganic pigment, a solvent, and a binder, and is formulated to achieve a viscosity suitable for coating in a coating process (e.g., at least 50 wt % solvent, at least 10 wt % binder, and at least 10 wt % pigment; or 50-70 wt % solvent, 10-25 wt % binder, and 10-30 wt % pigment). Examples of suitable coating processes include gravure coating, sputtering, vacuum depositing, solution coating, or the like. One or more layers (e.g., one to four layers) of the dispersion may be applied to the substrate to yield coating 110, 110', with coating 110' on a front side of dynamic window 108, coating 110 on a back side of dynamic window 108, or both. In some cases, coating 110' completely covers the front side of dynamic window 108, coating 110 completely covers the back side of dynamic window 108, or both. In other cases, portions of dynamic window 108 are free of coating 110, 110', with the excluded regions in the form of text, images, or the like.

The inorganic pigment generally includes particles such as rod-shaped particles or structured thin metallic platelets (e.g., flakes) that act as mirrors. The optical intensity of the platelets changes according to the angle from which they are viewed. Maximum light intensity is achieved near the angle at which the incident light is totally reflected. Minimum light intensity is experienced at an angle far away from total reflection. After the dispersion is applied to the substrate, the solvent evaporates and the particles align on the substrate and are immobilized in the binder, yielding aligned particles in a film on the substrate. When the primary light source is transmitted through the dynamic window toward the viewer, coating 110, 110' has a transparent appearance.

Examples of suitable solvents include ketones, aliphatic or cyclic ethers, and acetates, such as ethyl acetate, propyl acetate (e.g., n-propyl acetate), butyl acetate (e.g., n-butyl acetate), and the like. Examples of suitable binders include PVCs, vinyl acetates, and copolyester resins (e.g., VITEL copolyester resins available from Bostik, such as VITEL 2700B LMW and VITEL 5833B, and the like) that are soluble in the solvent. Examples of suitable inorganic pigments include IRIODIN/AFFLAIR 103 Rutile Sterling Silver (available from EMD Chemicals) and FLAMENCO Gold 220C (available from BASF). IRIODIN/AFFLAIR 103 Rutile Sterling Silver is a pearlescent silver pigment comprised of mica-based flakes coated with a thin layer of metal oxides (e.g., $TiO_2$ and $SnO_2$). FLAMENCO Gold 220C is a pearlescent gold pigment that includes mica and $TiO_2$. The interplay of colors produced by these pigments is due to the layered structure of the metal oxides, which is also imparts a rich, deep glossy effect. Particle sizes ranging from about 10 to about 60 microns are suitable for digital thermal printing ribbon application described herein (e.g., 300 dpi). In one example, coating 104, 104' is formed from a dispersion containing 12.4 wt % n-butyl acetate, 49.6 wt % n-propyl acetate, 16.5 wt % VITEL 2700B LMW, 1.5 wt % VITEL 5833B, and 20 wt % Flamenco Gold 220C.

During personalization of the card blank, ghost image 112 may be printed on a transparent layer (e.g., receiver layer 210) superimposed on dynamic window 108. Referring to ID document 100, when dynamic window 108 is viewed from back 108 of ID document 100 in reflected light, the light travels through transparent layers of the ID document and reflects from coating 104 imparting an opaque appearance to the dynamic window, and image 110 is not visible. When dynamic window 108 is viewed from front 104 of ID document 100 in reflected light, light travels through transparent layers of the ID document to ghost image 112 and coating 110 and reflects from the coating, such that the image is seen to have a background that corresponds to the coating. When dynamic window is viewed from front 104 or back of ID document 100 in transmitted light (e.g. backlit), light is not reflected from coating 110 and dynamic window 108 and ghost image 112 have a transparent appearance. When an image is printed or superimposed on a back of dynamic window 108 (e.g., on receiver layer 210'), corresponding principles apply, based on the presence of coating 110, 110', or both.

In one implementation, identical images are printed on each receiver layer and on a front or back of the dynamic window, with the identical images superimposed such that the identical images appear to be a single image or three separate images based on the angle at which the dynamic window is viewed from the front of the identification document in light transmitted through the dynamic window from a back of the identification document toward the front of the identification document.

In one example, a card blank corresponding to ID document described herein includes layers 202, 204, 204', and 206, 206', as defined below.

Structural layer 206: 7 mil polycarbonate (PC) (non-sensitized);

Tie layer 204: 5 mil five-layer co-extruded tie layer (e.g., PETG/PETG+PC/PC/PETG+PC/PETG);

Core layer 202: 6 mil white polyvinyl chloride (PVC) with window;

Tie layer 204': 5 mil five-layer coextruded tie layer (e.g., PETG/PETG+PC/PC/PETG+PC/PETG); and Structural layer 206': 7 mil PC (non-sensitized).

Receiver layers 210, 210' (e.g., 2-6 mil D2T2 receiver layers) may be coated on structural layers 206, 206', respectively, prior to personalization. The card blank may be personalized in a CI or OTC setting and the printed card may be overlaminated. In one example, overlamination layers 212, 212' may be printed over receiver layers 210, 210', respectively, with a desktop (e.g., D2T2) printer or large in-line printer or laminator (e.g., Datacard MX-6100).

It should be appreciated that while many of the figures shown herein illustrate a particular example of an ID document (e.g., a driver license) the scope of this disclosure is not so limited. Rather, methods and techniques described herein, apply generally to all ID documents defined above. Moreover, techniques described herein are applicable to non-ID documents, such as embedding 3D images in features of ID documents. Further, instead of ID documents, the techniques described herein can be employed with product tags, product packaging, business cards, bags, charts, maps, labels, etc. The term ID document is broadly defined herein to include these tags, labels, packaging, cards, etc. In addition, while some of the examples above are disclosed with specific core components, it is noted that laminates can be sensitized for use with other core components. For example, it is contemplated that aspects described herein may have applicability for articles and devices such as compact disks, consumer products, knobs, keyboards, electronic components, decorative or ornamental articles, promotional items, currency, bank notes, checks, or any other suitable items or articles that may record information, images, and/or other data, which may be associated with a function and/or an object or other entity to be identified.

Further modifications and alternative implementations of various aspects will be apparent to those skilled in the art in view of this description. For example, while some of the detailed implementations described herein use UV, IR, thermachromic, and optically variable inks and/or dyes by way of example, the present disclosure is not so limited. Accordingly, this description is to be construed as illustrative only. It is to be understood that the forms shown and described herein are to be taken as examples of implementations. Elements and materials may be substituted for those illustrated and described herein, parts and processes may be reversed, and certain features may be utilized independently, all as would be apparent to one skilled in the art after having the benefit of this description.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third party services, components, libraries, and such, as appropriate. Conversely, the features and functionality of various components can be combined into single components as appropriate The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few Computer readable media (transitory or non-transitory, as appropriate) suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. An identification document comprising:
a multilayer laminate comprising a core layer defining an opening therethrough;
a window positioned in the opening through the core layer, the window comprising a transparent plastic film;
a ghost image comprising optically variable media applied over the window, and wherein the ghost image is a planar ghost image formed from the optically variable media applied over a first side of the window and has a first appearance when viewed from a front of the identification document in reflected light at a first angle, the ghost image has a second, different, appearance when viewed from the front of the identification document in reflected light at a second, oblique angle, and the ghost image is unobservable when viewed from the front of the identification document in light transmitted from a back of the identification document through the window; and an optically variable coating applied over a second side of the window.

2. The identification document of claim 1, wherein the ghost image comprises a halftone image.

3. The identification document of claim 1, wherein the ghost image is a halftone image of a photographic image of a cardholder.

4. The identification document of claim 1, wherein the ghost image is less visible in the second appearance at the second, oblique angle compared to the first appearance at the first angle.

5. The identification document of claim 1, wherein ghost image is responsive to ultraviolet light.

6. The identification document of claim 1, wherein ghost image is responsive to infrared light.

7. The identification document of claim 1, wherein the optically variable media includes high refractive index (HRI) material.

8. The identification document of claim 1, wherein the optically variable coating is observable when viewed in light reflected off of the window, and unobservable when viewed in light transmitted through the window.

9. The identification document of claim 1, wherein the optically variable media of the ghost image is a first color and the optically variable coating is a second, different color.

10. The identification document of claim 1, wherein the optically variable coating comprises rod-shaped inorganic particles.

11. The identification document of claim 1, wherein the optically variable coating comprises structured metallic platelets.

12. The identification document of claim 1, wherein the ghost image is a duplicate of an image on the front of the identification document.

13. The identification document of claim 1, further comprising:
a second ghost image comprising a first area including optically variable media applied to the identification document and a second area without the optically variable media, wherein the optically variable media is applied in the first area in a pattern representative of a negative image, and wherein the second ghost image appears as a positive image when viewed from a front of the identification document in reflected light at a first angle and appears as the negative image when viewed from the front of the identification document in reflected light at a second, oblique angle.

14. A document comprising:
a multilayer laminate comprising a core layer defining an opening therethrough;
a window positioned in the opening through the core layer, the window comprising a transparent plastic film;
a ghost image comprising optically variable media applied over the window, and wherein the ghost image is a planar ghost image formed from the optically variable media applied over a first side of the window and has a first appearance when viewed from a front of the document in reflected light at a first angle, the ghost image has a second, different, appearance when viewed from the front of the document in reflected light at a second, oblique angle, and the ghost image is unobservable when viewed from the front of the document in light transmitted from a back of the document through the window; and
an optically variable coating applied over a second side of the window.

15. The document of claim 14, wherein the document comprises at least one of a smart card, a contact card, a contactless card, a proximity card, a certificate, a badge, or a tag.

16. The document of claim 14, wherein the document comprises at least one of a currency, a bank note, a legal instrument, or a check.

17. The document of claim 14, wherein the document comprises a credit card, a bank card, a phone card, a stored value card, a prepaid card, a debit card, or a gift certificate.

18. The document of claim 14, wherein the document comprises a passport, a driver license, a visa, an immigration document, a national ID card, a citizenship card, a social security card, a security badge, an identification card, a voter registration card, a voter identification card, a police identification card, a border crossing card, a security clearance badge, a handgun permit, or a membership card.

* * * * *